June 10, 1924.
J. ALTMANN
FUEL STORAGE TANK FOR MOTOR CARS
Filed March 15, 1921    7 Sheets-Sheet 1
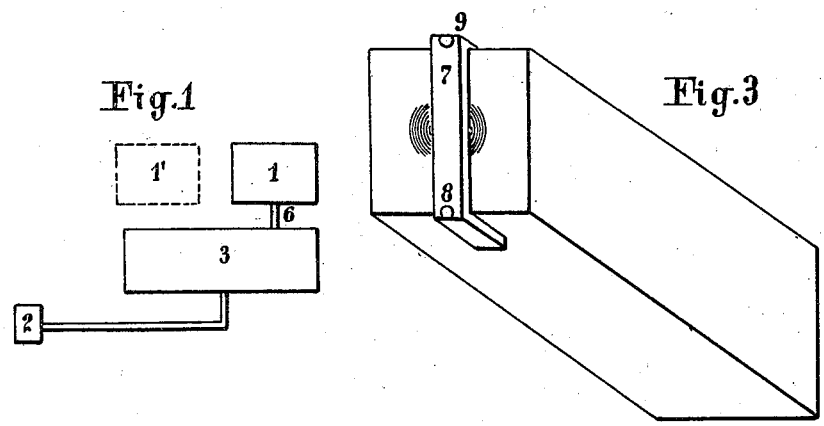
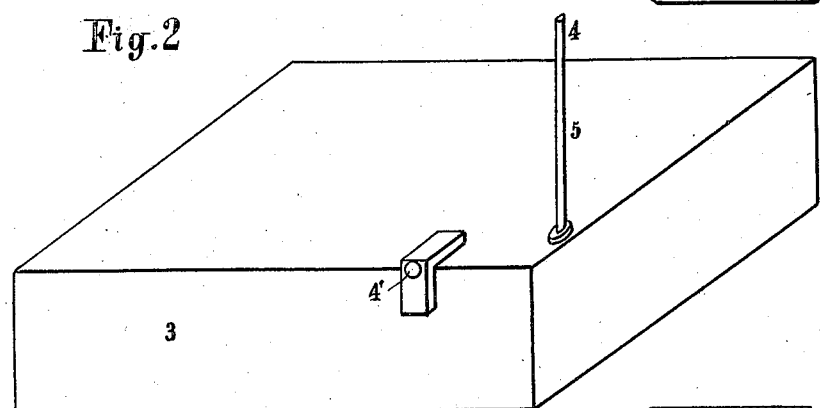
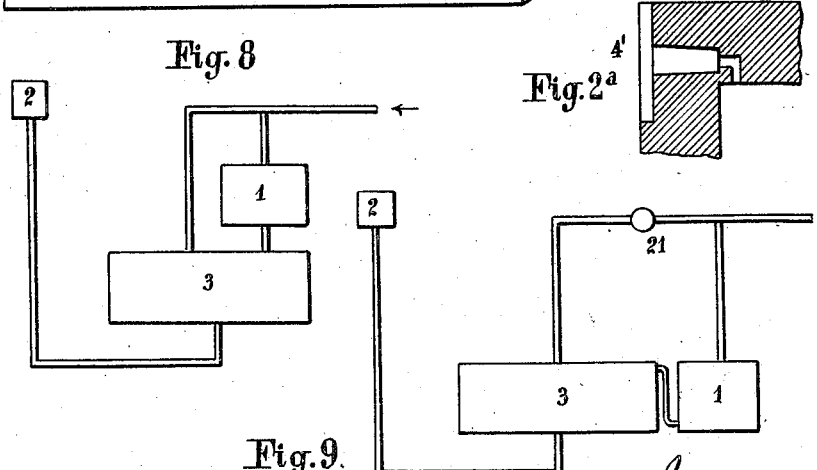
Inventor:
Josef Altmann,
by
attorneys.

June 10, 1924.

J. ALTMANN

FUEL STORAGE TANK FOR MOTOR CARS

Filed March 15, 1921   7 Sheets-Sheet 2

1,497,313

Inventor:
Josef Altmann

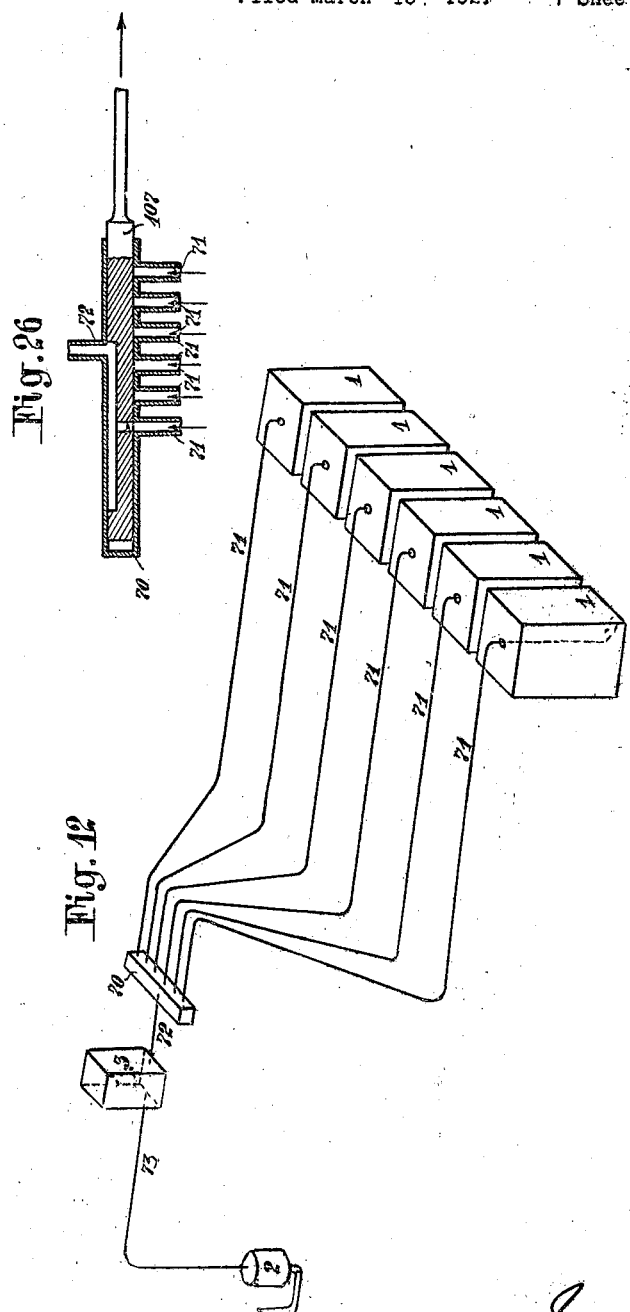

June 10, 1924.
J. ALTMANN
1,497,313
FUEL STORAGE TANK FOR MOTOR CARS
Filed March 15 1921   7 Sheets-Sheet 4
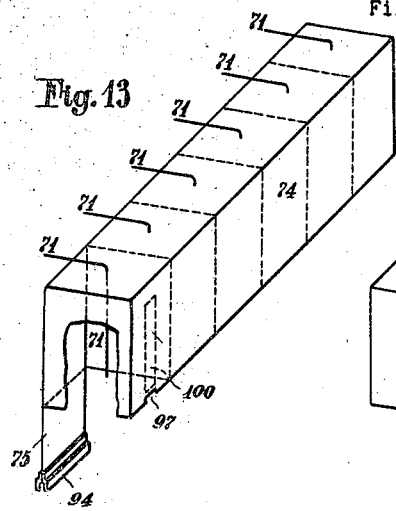
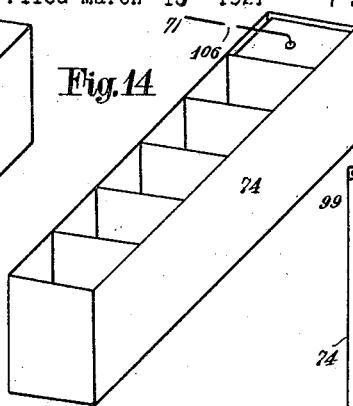
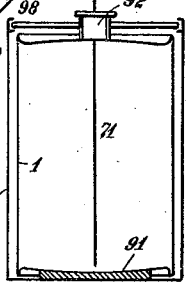
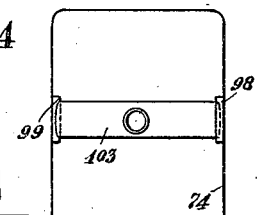
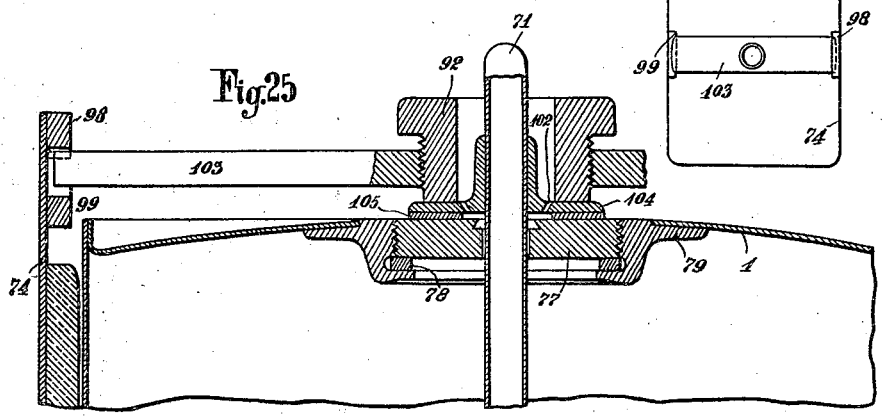
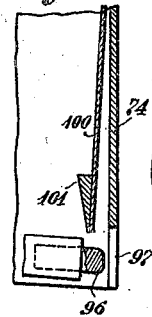
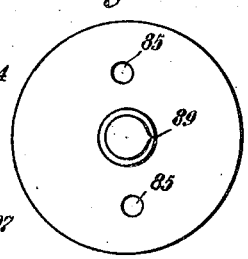
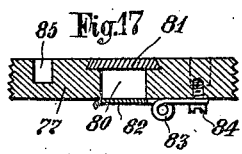
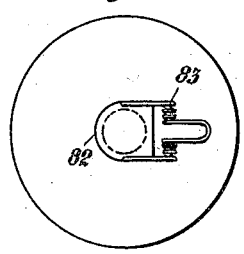
Inventor:
Josef Altmann.
by
T. L. F. Bradbury
attorneys

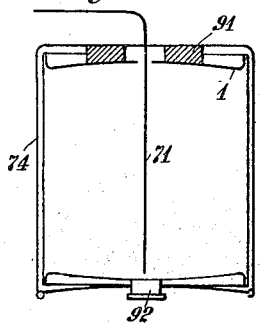
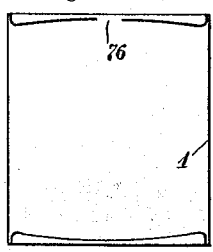
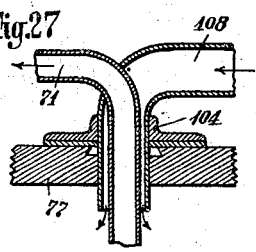
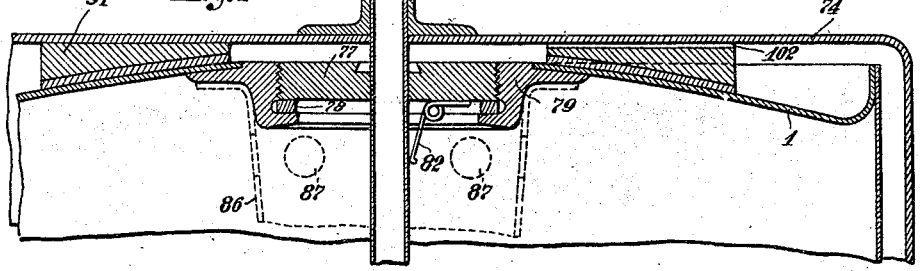
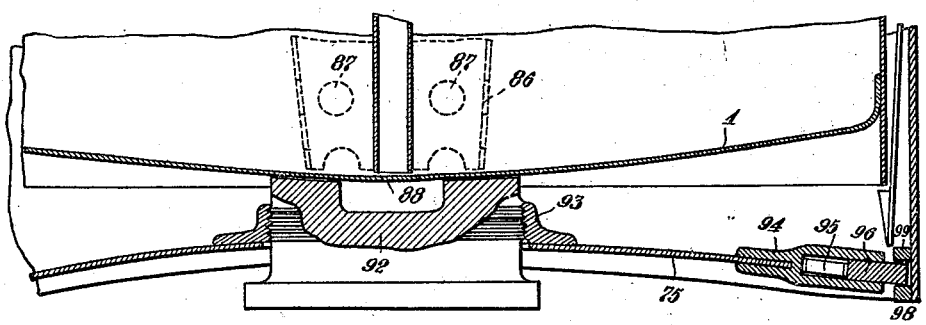

June 10, 1924.
J. ALTMANN
FUEL STORAGE TANK FOR MOTOR CARS
Filed March 15, 1921 7 Sheets-Sheet 7
1,497,313
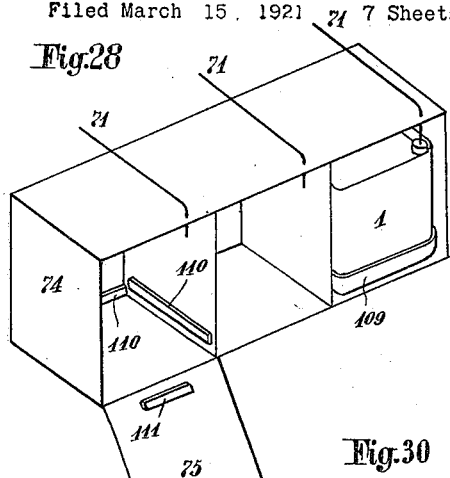
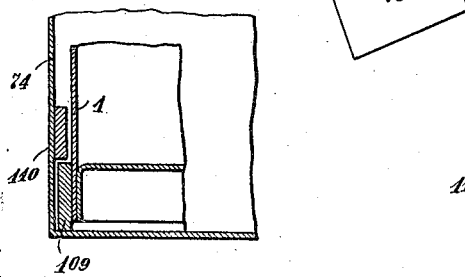
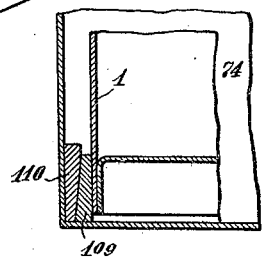
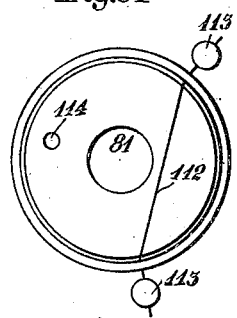
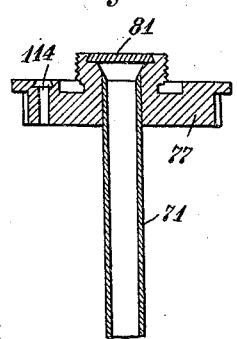
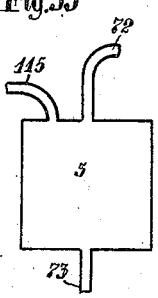

Patented June 10, 1924.

1,497,313

UNITED STATES PATENT OFFICE.

JOSEF ALTMANN, OF VIENNA, AUSTRIA.

FUEL-STORAGE TANK FOR MOTOR CARS.

Application filed March 15, 1921. Serial No. 452,598.

*To all whom it may concern:*

Be it known that I, JOSEF ALTMANN, a citizen of the Realm of Austria, residing at XVIII Vincenzgasse 24, Vienna, Austria, have invented an Improved Fuel-Storage Tank for Motor Cars (for which applications have been filed in the following countries: Austria, filed 18th Dec., 1915, granted 2nd Dec., 1921, under No. 87451; Austria, filed 1st Apr., 1916, granted 2nd Dec., 1921, under No. 87452; Austria, filed 2nd Dec., 1919, granted 3rd Jan., 1922, under No. 87983; Czechoslovakia, filed 3rd Jan., 1921, granted 30th June, 1923, under No. 11134; Czechoslovakia, filed 5th Jan., 1921, granted 30th June, 1923, under No. 11135; Germany, filed 15th Nov., 1916, granted 30th Sept., 1920, under No. 330760; Germany, filed 25th Nov., 1920, granted 15th Sept., 1921, under No. 344965; Hungary, filed 29th Nov., 1920, granted 29th Sept., 1921, under No. 79684; Hungary, filed 30th Nov., 1920, granted 4th June, 1923, under No. 83561; France, filed 20th Dec., 1920, granted 26th Aug., 1921, under No. 528843; Switzerland, filed 24th Dec., 1920, granted 8th Feb., 1922, under No. 94136; Poland, filed 30th Dec., 1920, not yet granted; Holland, filed 13th Jan., 1921, accepted 15th Oct., 1923; Great Britain, filed 6th Jan., 1921, granted 6th Apr., 1922, under No. 156522; Great Britain, filed 6th Jan., 1921, granted 6th Apr., 1922, under No. 156623; Italy, filed 10th Mar., 1921, granted 28th June, 1923, under No. 562/116; Rumania, filed 5th Mar., 1921, No. 6014), of which the following is a specification.

This invention has for its object to provide an improved fuel tank for motor-cars and the like vehicles, and it consists in this that the improved tank is composed of a plurality of containers, and the store of fuel is replenished by substituting a full container for an empty one.

By the use of a tank according to this invention, compared with the fuel tanks or benzine tanks used at present in motor-cars, the advantage is obtained that all pouring-out of the fuel or benzine is avoided. The removable portion of the tank can be constructed directly as a container in which the fuel or benzine is placed upon the market. Then according to this invention the container in which the fuel is bought, is connected directly to the second portion of the tank, that is to say, indirectly straight to the carburetter. Consequently by this invention, all pouring of the fuel or benzine from a container into the fuel tank of the car is avoided.

The preferred form of the improved tank is that in which the fuel tank is composed of at least two containers, namely, of a fixed container and at least one removable container. In this preferred form the fixed container is preferably given a capacity which is at least equal to, but is preferably a multiple of the capacity of the removable container, so that by reason of the size of the fixed container, a suitable time can always be chosen for removing the removable container which has become empty.

This invention is applicable to "pressureless" tanks, that is to say, tanks situated above the level of the carburetter, as well as to pressure tanks, that is to say, tanks situated below the level of the carburetter.

The several views of the accompanying drawings, forming part of this specification, may be briefly described as follows:

Figure 1 is a diagrammatic view of one form of embodiment of my invention, showing a carbureter in combination with a fixed tank and a removable container arranged, both, above the carbureter;

Figure 2 is a detached detail view, in perspective, of one form of fixed tank that may be used in my combination of parts;

Figure 4:
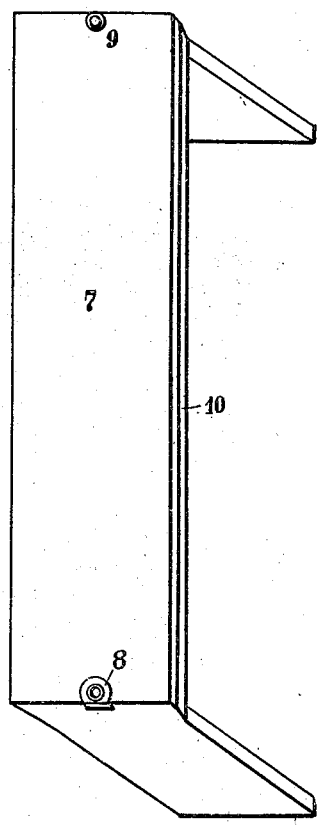
Figure 6:
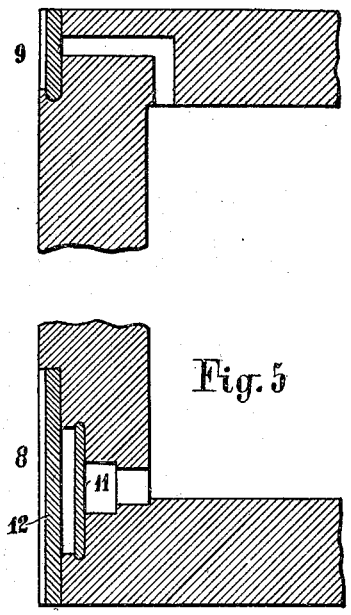
Figure 5:
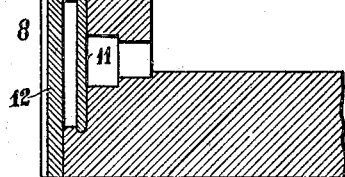
Figure 10:
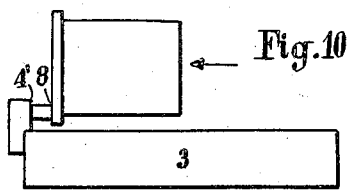
Figure 7:
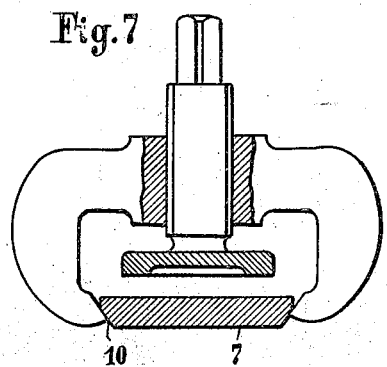
Figure 11:
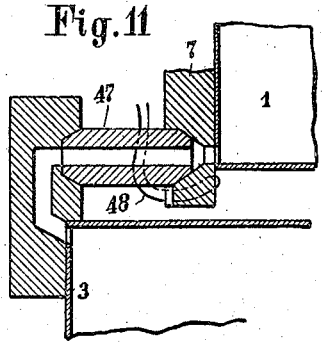

Figure 2ª is a fragmentary sectional detail view of the tank shown in Fig. 2;

Figure 3 is a detached detail view, in perspective, of one form of removable tank that may be used in my combination of parts;

Figure 4 is a detached detail view, in perspective, of the bar carried by the tank shown in Fig. 3;

Figures 5 and 6 are fragmentary sectional detail views of the tank shown in Fig. 3;

Figure 7 is a transverse sectional view of the bar shown in Fig. 3, engaged by a lead-seal press shown in partial section;

Figures 8 and 9 are diagrammatic views of a tank arranged below the carbureter;

Figure 10 is a diagrammatic view of a fixed and a removable tank, showing a form of connection therebetween;

Figure 11 is a sectional view of the structure of Fig. 10;

Figure 12 is a diagrammatic view showing a plurality of removable containers and a fixed tank, with means for successively placing the removable containers in communication with said fixed tank;

Figures 13, 14 and 28 are detail views of three forms of container-boxes for the removable containers of Fig. 12;

Figures 15 to 25, 27, and 29 to 32 are detail views of the removable container, some of these views showing also the box or receptacle therefor;

Figure 26 is a longitudinal sectional detail view of the valve and valve-casing shown in Fig. 12; and Figure 33 is a diagrammatic view of a fixed tank formed as a suction device for the delivery of the fuel.

Fig. 1 illustrates a constructional example of this invention comprising a fuel tank composed of a fixed container and one removable container, the two portions being arranged one behind the other. 3 is the fixed portion of the benzine tank, 1 is its removable portion, and 2 is the carburetter. In the constructional example shown in the drawings, the tank is situated at a higher level than the carburetter 2, and it is located for instance under the driver's seat. The space by the side of the removable portion 1 may be utilized for receiving one or more removable containers 1'.

It is particularly advantageous to provide in addition to the removable container 1· connected to the fixed portion 3, another full removable container 1' as a spare, as shown in Fig. 1. Then the entire space above the fixed tank is completely utilized, and also the space inside a common casing for all three containers, which may have the shape of the usual tanks at present employed.

The fixed portion 3 (Fig. 2) is provided with an air inlet aperture 4 which is situated at the end of a pipe 5 at a higher level than the highest level in the removable container. This pipe may at the same time be constructed as a benzine level indicator.

The removable portion 1 (Fig. 3) is so constructed as to be adapted for transport or as a trade container. Therefore the closure of its connecting aperture, its air inlet aperture, and if necessary, its filling aperture, must be so formed that none of its parts that are liable to become damaged, shall project beyond the limiting surface of the tank. It is made quite smooth and provided with a flat iron strip 7 in which the connecting aperture 8 and the air inlet aperture 9 are situated, and if necessary also a larger filling aperture for quick filling of the container.

The flat iron strip 7 may be suitably bent to provide a handle, or as shown in the drawing (Fig. 3) by forming a depression in the tank, space is afforded beneath the strip or bar 7 so that the latter may be grasped by a person's hand and the container thus carried.

The normal position of the removable container during transport is preferably vertical, so that the flat iron strip 7 is at the top. The position for connecting the removable container is on the contrary preferably horizontal, so that its connecting aperture is situated above the connecting aperture of the fixed tank.

The arrangement of the flat iron strip 7 (Figs. 3 and 4) and of the connecting and air inlet apertures in the flat iron strip is preferably such that first when the container is situated in its horizontal connecting position, its lowest level will be still above the lowest point of the connecting aperture, and its highest level will be situated below the lowest point of the air inlet aperture (Figs. 5 and 6), or when there is also provided a special filling aperture, it will be situated below this, and secondly when the container is in its vertical transport position, the highest level of the benzine will be situated below the connecting aperture and the air inlet aperture, so that when the benzine container is in a vertical position, no benzine can flow out of either of the two apertures, and when the container is in its horizontal position, benzine can flow only out of the benzine connecting aperture 8.

The closure of all the apertures of the container is effected for transport purposes by means of leaden seal discs which are sunk in the flat iron strip 7 and cannot therefore be damaged.

The flat iron strip 7 is formed for instance by bevelling at 10 (Figs. 4 and 7), to serve as a suitable abutment for a leaden seal press adapted to be slidden on it from the side, by means of which the leaden seals are pressed into recesses. Lead seals may also be sunk directly into the container 1 (as shown in Figs. 5 and 6), in cases where the bar 7 is dispensed with. For the connecting aperture (Fig. 5) it is advisable to employ leaden seals 11 and 12 of different thicknesses, of which the thicker seal 12 can be removed by hand or by means of a tool, whereas the thinner seal 11 is perforated by inserting a connecting device 6 arranged between the stationary portion 3 and the removable portion 1 (Fig. 1).

The connecting device 6 (Fig. 1) by means of which the removable portion 1 is connected to the connecting aperture 4' of the stationary portion 3 (Fig. 2), is preferably connected to the stationary container in order to enable the removable container to be made without any projection.

Figs. 8 and 9 illustrate the invention diagrammatically in the case of a tank under pressure situated at a lower level than the carburetter 2. When the removable portion is situated higher than the stationary portion, then both the stationary and removable portion are connected to the delivery pipe (Fig. 8).

When on the contrary the removable portion 1, instead of being arranged above the stationary portion 3, is arranged for instance by its side (Fig. 9), then a higher pressure must be produced in the removable portion than in the stationary portion, and this is effected for instance by reducing the pressure in the delivery pipe leading to the removable portion to a smaller amount than in the stationary portion. Then in such a case there is arranged for instance at 21 a pressure reducing valve which still further reduces the pressure before entering the stationary container 3.

Figure 10 shows a modified respective arrangement of the fixed tank and exchangeable can and Fig. 11 show connecting means especially adapted for this purpose. Connecting the openings 8 and 4' of the tanks 1 and 3 is a pipe piece or tube 47 of elastic material (such as rubber), conically shaped at both ends. The exchangeable can is only provided with the outer lead seal 12 (Fig. 5). After the seal is removed the pipe piece 47 is inserted into the conical seat of the flat iron, 7, the wire spring lock 48 compressing or pinching the rubber tube 47, so that no petrol is allowed to flow off. The can 1 is then placed in position (as shown in Fig. 10) and pushed in the direction of the tank 3, until the pipe piece fits liquid tight into the conical seat of the connecting piece of the fixed tank. The cam 1 is then locked in position and the spring lock removed.

The fuel tank may be composed of a plurality of removable parallel, independent, and non-communicating containers which when full are placed in the car, and are connected up successively to the carburetter of the car, so that they become emptied successively. The empty containers are replaced by full ones and thus the store of fuel is replenished. In the preferred arrangement there is arranged between the parallel-connected removable containers and the carburetter a fixed container which is common to all the removable containers and from which the carburetter is fed. This fixed container is replenished by the contents of the several removable containers.

Some constructional forms of this invention are illustrated by way of example in Figs. 12 to 33 of the acompanying drawings.

In Fig. 12 1 is the removable container; 2 is the carburetter; 3 is the fixed container arranged between 1 and 2; and 70 is the switch arranged between 1 and 3. Pipes 71 lead from the removable containers 1 to the switch 70, and a pipe 72 leads from the latter to the fixed container 3, which is connected by a pipe 73 to the carburetter 2.

The nature of this invention is not affected by the fact that the delivery of the fuel from the removable containers 1 is effected by suction, pressure, or gravity.

The removable containers 1 are preferably arranged in a separate container box 74 (Fig. 13, Fig. 14 and Fig. 28) which is provided in place of the present-day usual fuel tank in the car.

The switch 70 is preferably mounted on the fixed container 3 or on the container box 74, so that it does not require any special mounting. This arrangement on the container box 74 has the advantage of making the pipes 71 which are numerous, short, and only the pipe 72 is longer. In this case the device for operating the switch should lead from the driver's seat.

The most important parts of the installation will now be described separately hereinafter, that is to say, the container box 74, the removable containers 1, the device for fastening the removable containers in the container box, and the switch 70.

The container box 74 is shown in three different constructional forms in Figs. 13, 14 and 28.

Figs. 13 and 28 illustrate a container box 74 for removable containers designed to be arranged at the back of the car.

Fig. 14 illustrates a container box 74 for removable containers intended to be arranged in front under the driver's seat.

The container box 74 comprises for instance six cells into which the pipes 71 extend. The removable containers are preferably slipped into these cells from underneath, so that the pipes 71 enter the interior of the containers. After the containers 1 have been slipped in, they are fastened in the container box. This is done for instance by means of doors 75 capable of being fastened that constitute the bottom of the cells of the container box.

In the constructional example shown in Figs. 14 and 28, the container box 74 comprises cells which are open at the top (Fig. 14) or open at the rear (Fig. 28). The removable containers are placed from the top or from the rear into these cells and are fixed in place in a manner hereinafter described.

The removable containers 1 are shown in a constructional example in Fig. 15. The details of their formation are shown in some constructional forms illustrated in Figs. 16, 17, 18, 19 and 20.

The removable containers 1 may be of any suitable shape. For the sake of economy in space they are preferably made of prism shape, and are provided with a filling aperture 76 at the top, preferably at the centre thereof (Fig. 15). This aperture is fitted with a removable closing member 77 (Fig. 16) which is screwed for instance with the interposition of a packing 78 in a neck 79 of the aperture 76. This closing member is formed at its centre with an aperture 80 (Fig. 17) preferably provided on the outside of the closing member with a leaden seal 81 and on the inside with a spring closing flap 82 (Figs. 16, 17, 19). The spring 83 of the closing flap is attached for instance by means of a screw 84 to the closing member, which is preferably provided with holes 85 for the insertion of a screw key.

Owing to the pressure to which the container may be subjected in being fixed in the container box 74, the top and bottom of the container are made convex, and if necessary, stiffened by means of a tube 86 arranged between the top and the bottom of the container. This tube has holes 87 to allow the fuel to flow through rapidly in the filling operation. At the lowest point of the bottom there is a depression 88 (Fig. 16), so that the very last drops of the fuel can pass through the pipe 71 one end of which is in proximity to this depression.

If the pipe 71 should almost entirely fill up the aperture 80, then special air inlet holes 89 may be provided in the aperture 80 of the closing member 77 (Fig. 18).

The closing member 77 is screwed out only for filling the switch, and is furnished with a fresh leaden seal.

Figure 20:
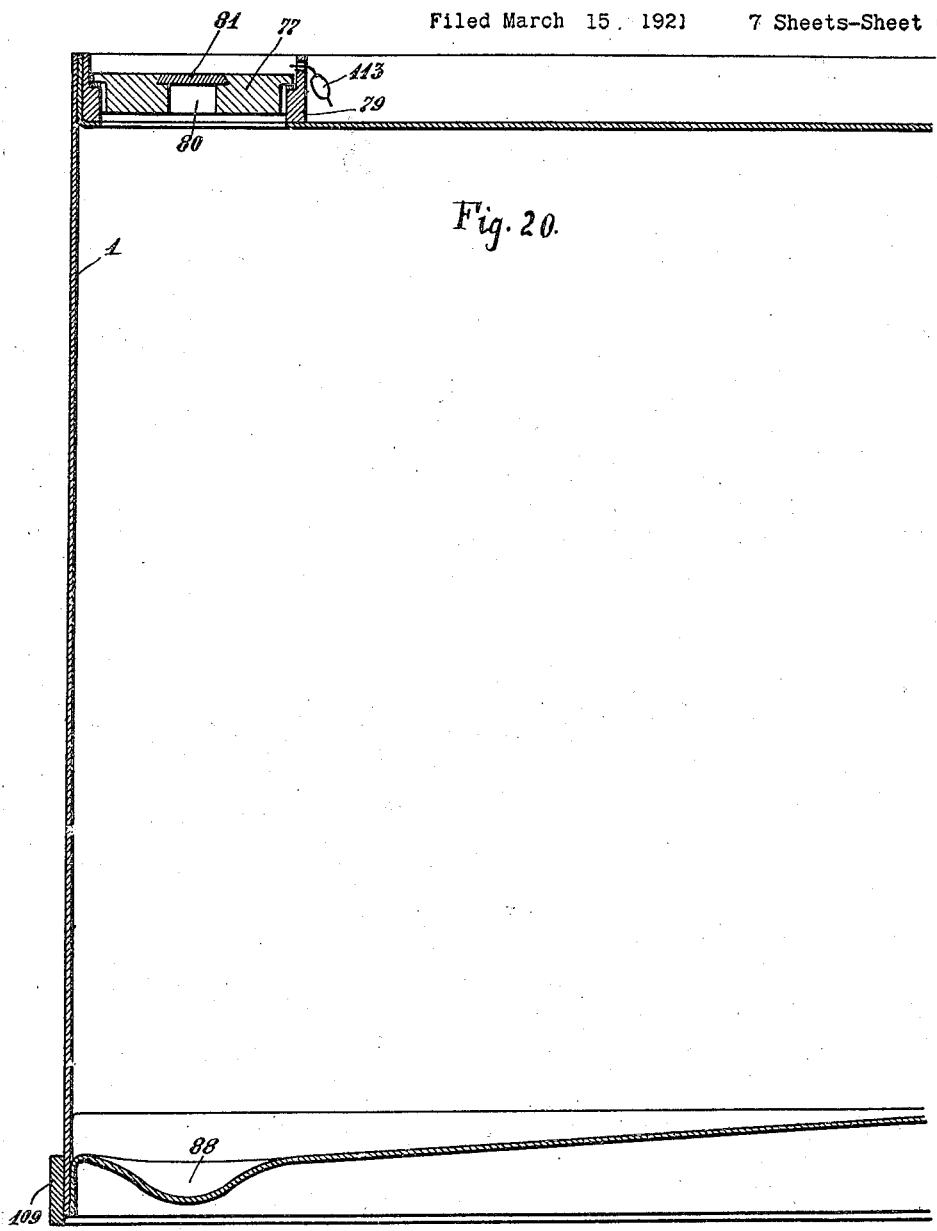

In the constructional example shown in Fig. 20, the top of the can has no projections on its inner side, so that the contents of the container can be poured out without leaving any remainder when the emptying, instead of being effected through the pipe 71, is to be effected by tipping the container after the plug has been screwed out.

The end of the pipe 71 projecting into the container may be fixed to the plug 77 (Fig. 32). In such a case however each container must be provided with a similar pipe.

The attachment of the removable containers 1 in the container box 74 of Fig. 13 is shown in Figs. 16 and 21.

The pipe 71 is made tight in the container box 74, for instance by means of a soldered-on neck 90. Abutments 91 for the top of the container are provided on the underside of the upper container box, whilst in the middle of the fastenable door 75 a screw 92 is formed in a neck 93 to serve as an abutment for the bottom of the container. The door 75, as shown for instance in Fig. 28, is hinged on one side in a hinge on the container box 74, and it is formed on its other side with a thickened edge 94 and a tongue 96 or the like which is pressed outwards by springs 95. The limiting of the outward movement of the tongue 96 is effected by means of stops (not shown) provided on the edge 94. In the fastened position of the door the spring tongue 96 bears against two fixed pairs of strips 98 and 99 arranged on both sides of the recess 97 (Figs. 13 and 22) of the container box 74. Above the recess 97 there is provided inside the container box a leaf spring 100 and an abutment 101 for this spring.

The operation of placing a removable container into a container box as shown in Fig. 13, is as follows:

The leaden seal 81 of the container 1 is knocked out and then the container is slipped from underneath into the cell of the container box 74. In this movement the end of the pipe 71 enters the aperture 80 of the plug 77, and knocks the spring flap 82 open. At the same time, in inserting the container, the leaf spring 100 is pressed against the wall of the container box. When the container has been completely inserted so that its top lies against the abutments 91, which may be provided if desired with air passage apertures 102, its lower edge is situated higher than the abutment 101 of the leaf spring 100. Consequently the container will rest with its lower edge upon the abutment 101 of the spring. Then the cell door 75 is closed, the tongue 96 being forced back by the finger of the operator. Then the tongue is released so that it enters between the strips 98, 99 of the container box and thus fastens the door. Then the screw 92 is tightened until the container is firmly in place. A loosening of the screw may be prevented by a suitable screw-locking device. The stiffening tube 86 ensures that the top and bottom of the container are not moved towards each other by the pressure of the screw 92, and that the pipe 71 shall not touch the bottom.

When the container 1 has been removed from the cell, the spring flap 82 closes as soon as the end of the pipe 71 passes out of the container. Thus the container is again closed which is very important for the sake of safety and also for the purpose of preventing soiling of the containers during transport.

The fixing of the removable containers in the container box 74 shown in Fig. 14, is illustrated in Figs. 23, 24 and 25.

Abutments 91 are provided on the bottom of the cells of the container box, and pairs of strips 98, 99 are provided on two opposite upper edges. Between these two pairs of strips a loop 103 is swung in carrying the tightening screw 92 at the centre. This screw is traversed by the rising pipe 71 which carries a neck 104 provided with air inlet holes and a jointing washer 105. This rising pipe is divided at 106 (Fig. 14).

The two portions of the vertical pipe may be connected together by means of a suitable coupling.

The operation of inserting a removable container is as follows:—

On removing the seal 81 the full container is placed in a cell of the container box. Then the pipe 71 over which the loop 103 has been slipped, is inserted from above into the container so that the loop 103 is swung in between the two pairs of strips 98, 99, and the screw 92 is tightened, thereby fixing the container firmly in place. Then by means of a suitable coupling at 106, the rising pipe is connected to the pipe 71.

When large heavy containers 1 (for instance in the case of motor-plows) are employed with their side walls suitably guided in the cells, then it is not necessary to fix the containers in place by means of the screw 92 and abutment 91.

The switch is illustrated in Fig. 26. The pipes 71 are connected successively with the pipe 72 by the various positions of the switch piston 107. The switch piston is preferably provided with a jamming clutch (not shown) acting in one direction only to prevent it from being pushed back unintentionally. The position of the switch will show the observer which containers are empty and can be removed.

It is obvious that instead of the piston 107, a circular slide valve may be employed in the switch.

Fig. 27 illustrates the arrangement of a rising pipe and a pressure pipe in case that a pressure delivery is to be employed instead of a suction delivery.

71 is the rising pipe enclosed concentrically by the pressure pipe 108.

Figs. 29 and 30 illustrate the fixing of a container according to Fig. 20 in a container box according to Fig. 28. The container (Fig. 20) has a strengthening band 109 at its base. When the container has been slidden into the container box as shown in Fig. 28, it is held in place for instance by means of strips 110 provided at the sides (Fig. 29) or at the back (Fig. 30) of the container box. At the door 75 (Fig. 28) there is provided a strip 111 which is preferably somewhat yielding (springy) and adjustable, and which likewise bears against the band 109 when the door is closed.

When the container has been slipped into the box, the point of connection for the pipe 71 should be readily accessible in order to enable the connection to be readily made. For this purpose the closing neck (the filling aperture) is provided in a corner of the container. (Figs. 20 and 28). This has the result of enabling the container to be easily emptied by being tipped. At the upper edge of the container there may be arranged ordinary folding handles for carrying the same which, when not in use, are accommodated in the depressed lid of the container.

Fig. 31 shows a leaden seal wire 112 drawn through apertures in the neck 79, the ends 113 of this wire being squeezed flat. This leaden seal wire prevents an unauthorised unscrewing of the plug 77.

Fig. 32 shows a plug to which the suction pipe is directly connected. In this case an additional air inlet aperture 114 (sealed before use) must be provided on the plug.

Fig. 33 is a diagrammatic view of the fixed container 3 which may also be constructed as a suction device for the delivery of the fuel. In this case the air is sucked out of the container 3 through the pipe 115. The fuel flows out of the container 1 through the pipe 72 into the container 3, and passes through a pipe 73 to the carburetter. When the connected-up container 1 is emptied, air instead of fuel is sucked in through the pipe 72 and flows out through pipe 115. This air which is sucked-in and sucked-out may be utilized to operate a whistle fitted in the pipe 72 or in the pipe 115 so as to show that the container is empty.

This improved fuel tank has the following advantages:—

1. There are no losses through evaporation and spilling, because the fuel has not to be poured.

2. All danger of ignition or explosion is prevented both in the case of the full container and of the empty container, because the container is always closed.

3. Owing to the necessity of changing the containers, the attention of the driver is drawn to the rate of the fuel consumption, whereas in the case of the present-day large fuel tanks, the driver does not trouble for days about the rate of consumption.

4. A ready means of checking the consumption is provided by simply noting the number of empty containers.

5. The stealing of fuel is made extremely difficult because without unscrewing the plug, the fuel can be poured out in any considerable quantity from the container only by a very tedious operation. The unscrewing of the plug is however indicated by the breaking of the leaden sealing device. Further, the door of the container box may be locked, so that no container can be taken out. This locking of the door entails no risk as to safety in working because should the rising pipe 71 of a container become choked, another container can be connected up.

Having now particularly described and ascertained the nature of my said invention and in what manner the same is to be performed, I declare that what I claim is:

1. The combination with an automobile, of a fixed fuel-tank carried thereby, a plurality of removable, non-communicating tanks also carried by the automobile, and means for successively placing said removable tanks in communication with said fixed tank.

2. The combination with an automobile, of a fixed fuel-tank carried thereby, a plurality of removable, non-communicating tanks also carried by the automobile, and valve-mechanism for successively placing said removable tanks in communication with said fixed tank.

3. The combination with an automobile, of a fixed fuel-tank carried thereby, a plurality of removable, non-communicating tanks also carried by the automobile, a valve-casing, a pipe from each of said removable tanks to said valve-casing, affording communication between said removable tanks and the interior of said valve-casing, a connection between said valve-casing and said fixed tank, whereby communication is afforded therebetween, and a valve in said valve-casing for placing said pipes successively in communication with said connection.

4. The combination with an automobile, of a fixed fuel-tank carried thereby, a plurality of removable, non-communicating tanks also carried by the automobile, a box accommodating said removable tanks, and means for successively placing said removable tanks in communication with said fixed tank.

ING. JOSEF ALTMANN.